(12) United States Patent
Ota et al.

(10) Patent No.: US 6,310,708 B1
(45) Date of Patent: Oct. 30, 2001

(54) SUPERVISORY SIGNAL TRANSMITTER AND METHOD

(75) Inventors: Kenji Ota; Mitsuo Kitamura, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,119

(22) Filed: Mar. 19, 1998

(30) Foreign Application Priority Data

Oct. 17, 1997 (JP) .................................................. 9-285062

(51) Int. Cl.⁷ .................................................. H04B 10/04
(52) U.S. Cl. .......................... 359/181; 359/110; 359/132; 359/177
(58) Field of Search .................................. 359/110, 132, 359/177, 181

(56) References Cited

U.S. PATENT DOCUMENTS

| | | | |
|---|---|---|---|
| 4,843,382 | * | 6/1989 | Oda et al. ........................ 340/825.06 |
| 4,994,675 | * | 2/1991 | Levin et al. ........................... 250/551 |
| 5,293,231 | * | 3/1994 | Elberbaum et al. .................. 348/521 |
| 5,317,439 | * | 5/1994 | Fatehi et al. .......................... 359/110 |
| 5,331,319 | * | 7/1994 | Ebersohl ........................... 340/870.28 |
| 5,861,967 | * | 1/1999 | Mizuochi et al. .................... 359/130 |
| 5,900,983 | * | 5/1999 | Ford et al. ............................ 359/627 |
| 5,978,113 | * | 11/1999 | Kight .................................... 359/110 |

\* cited by examiner

*Primary Examiner*—Leslie Pascal
*Assistant Examiner*—Hanh Phan (57) ABSTRACT

During a time interval when a supervisory signal is not transmitted, an idle signal which is different in frequency from but substantially equal in maximum power to the supervisory signal is output. The duty ratio of the idle signal is set so that the supervisory signal and the idle signal become substantially equal to each other in average power. A transmitter is equipped with a switcher for switching between the supervisory signal and the idle signal for selective application to a laser diode. The switcher is controlled by a command signal for supervisory and control. The laser diode is driven by an output of the switcher to transmit the supervisory signal and the idle signal.

17 Claims, 7 Drawing Sheets

SUPERVISORY SIGNAL TRANSMITTER AND METHOD

BACKGROUND OF THE INVENTION

1. Field of the Invention

The present invention relates to a supervisory signal transmitter and method for use with a WDM communications system.

2. Description of the Related Art

Nowadays, as information processing technologies have developed and advanced, the demand has increased for constructing a multimedia network which can handle various types of data in the field of communications as well. Such a multimedia network needs to be able to transfer large amounts of image data simultaneously with sound data. To this end, the network's signal transmission rate must be increased.

Optical communications networks using optical fibers are in the spotlight as such a network and have been researched and developed intensively. In particular, a light wavelength-division multiplexing (WDM) communications system is considered to be promising as a method of accommodating multiple channels with one optical fiber. To make such a WDM communications system feasible, it is necessary to use a technique for network supervision and control. As such a technique, a method will be used which supervises and controls repeaters and the like which make up a network by causing a supervisory signal (SV signal) used for network supervision and control only to flow through the network.

In a one-wave transmission system, the SV signal is generally transmitted superimposed upon a main signal. In the WDM communications system, it is promising to transmit the SV signal in a dedicated wavelength (channel). An arrangement for transmitting an SV signal to all repeaters that make up a network is proposed in, for example, Japanese Patent Application No. 9-065231.

Figure 1:
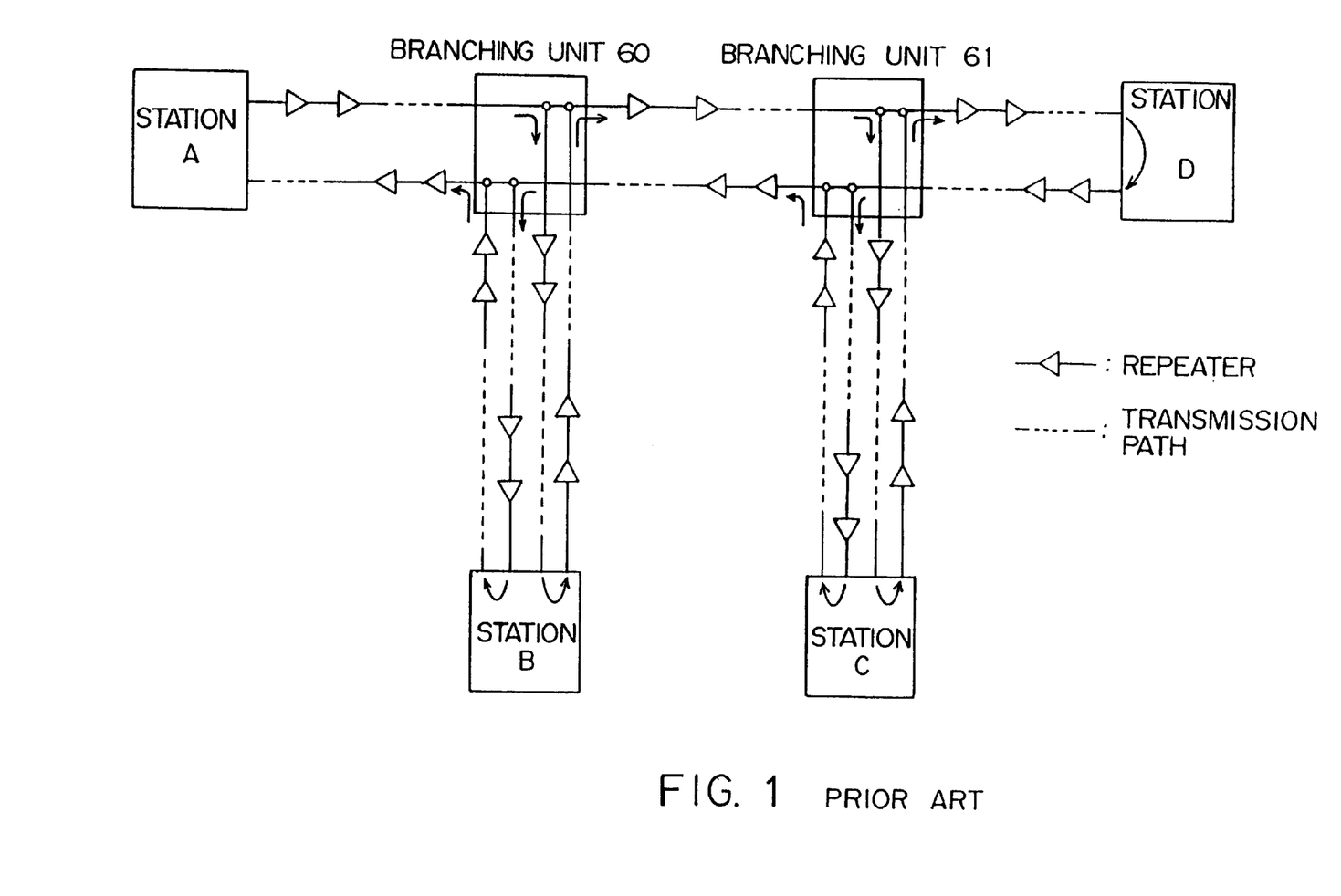
FIG. 1 illustrates a conventional SV signal transmission system.

FIG. 1 is a schematic diagram of the proposed SV-signal transmission system.

Stations A to D each transmit a light signal modulated with data to be sent. In the WDM communications system, different wavelengths are assigned to different channels and light signals of different wavelengths are wavelength-division multiplexed for transmission over a transmission path. The transmission path is equipped with a number of repeaters that amplify light signals attenuated as a result of transmission over the path, thereby allowing long-distance transmission.

In the middle of the transmission path, there are provided branching units 60 and 61 each of which separates a light signal of a specific wavelength from the wavelength multiplexed light signals and sends it over a separate transmission path. For example, a light main signal sent from the station A is separated by the branching unit 60 into a light main signal to be directed to the branching unit 61 and a light main signal to be directed to the station B.

The light main signal directed from the branching unit 60 to the station B is terminated by the station B. On the other hand, the light main signal directed to the branching unit 61 is further separated by the branching unit 61 into a light main signal to be directed to the station C and a light main signal to be directed to the station D. Each of the stations C and D terminates the received light main signal.

In the currently proposed SV-signal transmission system, for example, the station A is set to send and terminate an SV signal, and the SV signal and a light main signal are multiplexed together for transmission. At the branching unit 60, the SV signal is separated and then directed to the station B as shown by an arrow in the figure. At the station B, the SV signal is looped back to the branching unit 60. At the branching unit 60, the SV signal and the light main signal are multiplexed together for transmission to the branching unit 61. At the branching unit 61 as well, the SV signal is separated and then sent toward the station C. At the station C as well, the SV signal is looped back to the branching unit 61. At the branching unit 61, the SV signal and the light main signal are multiplexed together and directed to the station D. At the station D, the SV signal is likewise looped back to the branching unit 61. After that, as in the case of transmission from the station A to the station D, the SV signal is separated and multiplexed at the branching units 60 and 61, looped back to the corresponding branching unit at the stations B and C, and finally terminated by the station A.

By looping back the SV signal at the stations B, C and D in this manner, an SV signal-only path can be formed which begins at the station A and ends at the station A. By sending the SV signal over this path, all the repeaters on the network can receive the SV signal as is evident from FIG. 1. Thus, the provision of only one channel dedicated to the SV signal allows supervision and control over all the repeaters on the network. If it is impossible from the viewpoint of network configuration to form one path so that it can pass through all the repeaters, SV signals each assigned a different wavelength may be transmitted.

To acquire repeater's states (its output, the temperature of a light source used, etc.) from a specific repeater, data containing an identification number that identifies the specific repeater is transmitted using an SV signal as a carrier. That is, the data is represented as a digital signal by turning the SV signal on and off. However, since the SV signal is transmitted combined with a light main signal, the power of all the light signals containing the main signal and the SV signal will vary each time the SV signal is turned on or off. The transmission characteristics of an optical fiber depend on the power of a light signal which propagates therethrough. As a result, the transmission characteristics will vary each time the SV signal is turned on or off, degrading the performance of the WDM communications system.

One way to make the power of all light signal that propagates through an optical fiber constant will be to transmit a direct-current light in place of the SV signal when it is off. By regulating the output of the direct-current light properly, it becomes possible to keep the power of all the light signals constant so that the transmission characteristics of the WDM communications system will be placed in the stable state.

However, this method is not very desirable from the viewpoint of circuit arrangement.

Problems with the direct-current light-based system will be explained with reference to FIGS. 2A and 2B.

Figure 2A:
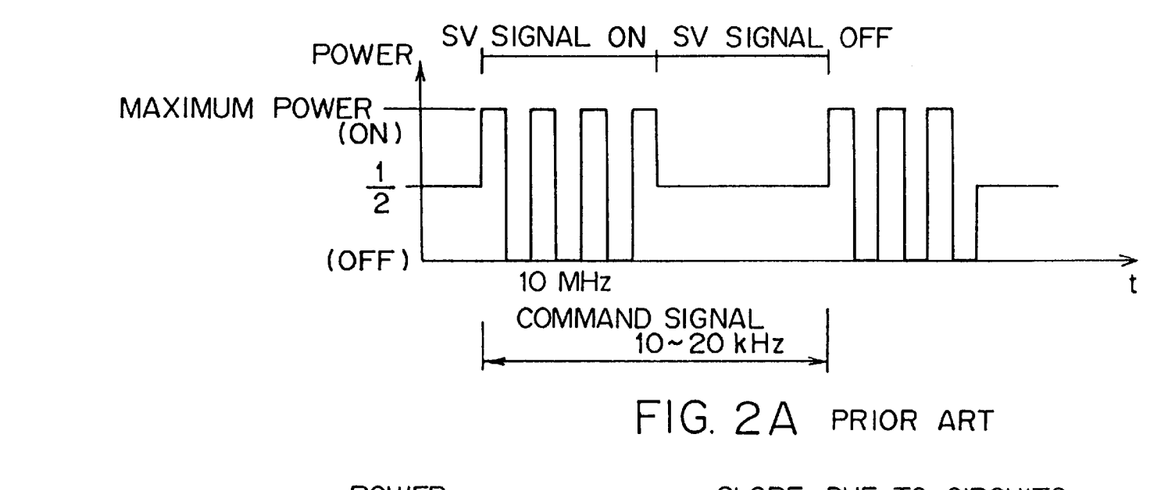
FIGS. 2A and 2B are diagrams for use in explanation of problems with the conventional system.
Figure 2B:
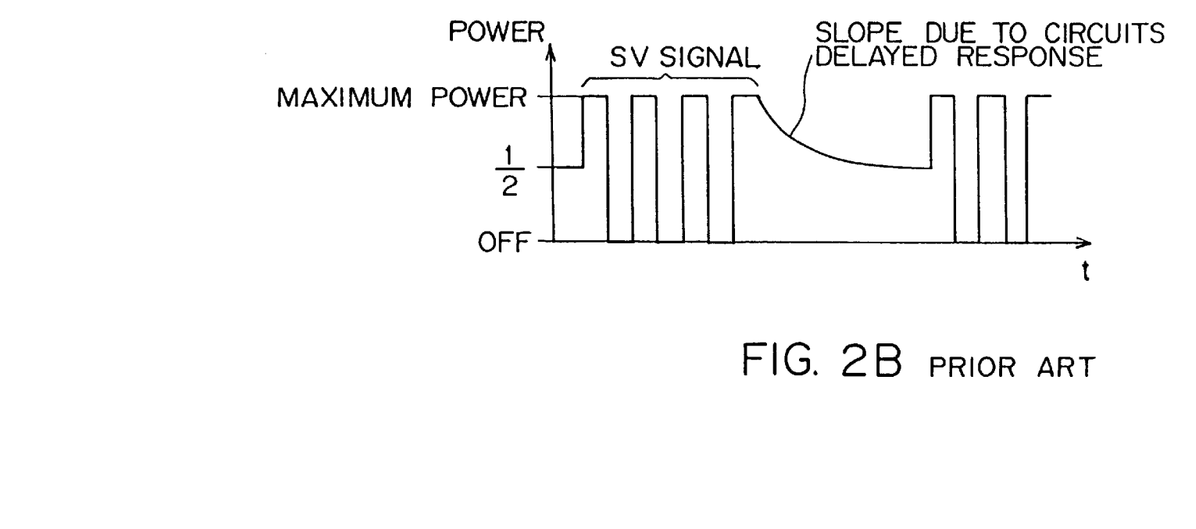

FIG. 2A shows the manner in which the direct-current light is output in the intervals when an SV signal is off.

In FIG. 2A, it is assumed that the SV signal is turned on and off at a frequency of 10 MHz and a command signal whose 1s and 0s are represented by the presence (on) and absence (off) of the SV signal has a frequency of 10 to 20 kHz. In order to transmit direct-current light having the same power as that of the SV signal propagating through optical fiber, it is required to set the power of the direct-current light lower than the maximum power of the SV signal (indicated as ON on the ordinate in FIG. 2A).

If, for example, the SV signal is a rectangular pulse train having a duty ratio of 50%, then it will be required to set the power of the direct-current light to one-half of the maximum power of the SV signal as shown in FIG. 2A. By so doing, a light signal which is constant in power on average can be transmitted all the time over optical fiber, providing stable transmission characteristics.

The problems with the transmission of direct-current light in the absence of the SV signal will be described with reference to FIG. 2B.

In an actual transmitter arranged to transmit direct-current light in the absence of an SV signal as shown in FIG. 2A, it is desirable that switching from the SV signal to the direct-current light be made instantaneously. In an actual circuit, however, since a laser light source used has delayed response, switching from the SV signal to the direct-current light cannot be made instantaneously, with the result that the power will attenuate gradually with time as shown in FIG. 2B. In FIG. 2B, this phenomenon is indicated as a slope due to the delayed response of the circuit.

Such a phenomenon appears as noise in the optical fiber, which results in the degradation of the transmission characteristics of the optical fiber and also causes errors in received data in the repeaters which receive the SV signal. In addition, problems arise in the circuit arrangement for generating the direct-current light as well. That is, describing in terms of the example of FIG. 2A, a circuit would be required which does not respond to the SV signal which is turned on and off at a repetition frequency of 10 MHz but responds to the command signal which is represented by the presence and absence of the SV signal and corresponds in frequency to 10 to 20 kHz. To construct such a circuit, a narrow band filter is required. Thus, the direct-current light generating circuit is complex in arrangement, large in size, and costly.

SUMMARY OF THE INVENTION

It is an object of the present invention to provide a supervisory signal transmitting method and device which permits the transmission characteristics of a light transmission system to be kept stable using a simple and inexpensive circuit arrangement.

According to an aspect of the invention, there is provided a supervisory signal transmitter for use with a WDM communications system comprising: a light source unit driven by an electrical signal for converting the electrical signal to a corresponding light signal; a supervisory signal generating unit for generating an electrical signal having a predetermined frequency to be used for driving the light source to produce a supervisory signal; an idle signal generating unit for generating an electrical signal having a frequency different from the predetermined frequency of the supervisory signal to be used for driving the light source to produce an idle signal; and a switching unit for switching between the electrical signal generated by the supervisory signal generating unit and the electrical signal generated by the idle signal generating unit for selective application to the light source, whereby the supervisory signal is output from the light source while no idle signal is output from the light source and vice versa.

According to the other aspect of the invention, there is provided a supervisory signal transmitting method for use with a WDM communications system comprising the steps of: generating a first electrical signal having a predetermined frequency for producing a supervisory signal; generating a second electrical signal having a frequency different from the predetermined frequency of the first electrical signal for producing an idle signal; switching between the first electrical signal and the second electrical signal to output the first and second electrical signals alternately; and converting each of the first and second electrical signals output alternately in the switching step into a light signal. According to the present invention, the supervisory signal and the idle signal are transmitted alternately over an optical fiber. This enables the power of the light signal propagating through the optical fiber to be kept constant all the time, preventing degradation of the transmission characteristics of the optical fiber due to variations in light signal power.

When the idle signal is set to have substantially the same maximum power as the supervisory signal, the transmitter circuit is only required to change the driving frequency for the light source with its output kept constant. Thus, the transmitter circuit is made simple and inexpensive.

The frequency of the idle signal may be changed for each station that transmits it, or the idle signal may be modulated with information to send, which permits efficient utilization of the available band of the optical fiber.

DESCRIPTION OF THE PREFERRED EMBODIMENTS

Figure 3A:
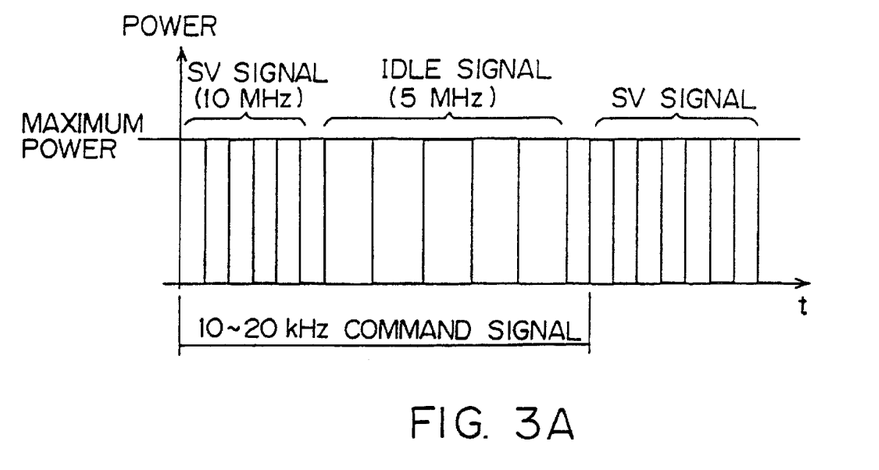
FIGS. 3A and 3B illustrate an embodiment of the present invention.

Referring now to FIG. 3A, an embodiment of the present invention is arranged such that, in the absence of an SV signal, an idle signal is transmitted which is lower in frequency than the SV signal. While no supervision is exercised and hence no SV signal is transmitted, the idle signal continues to be transmitted, thereby keeping stable the transmission characteristics of an optical fiber through which a light signal propagates. The idle signal is equal to the SV signal in maximum power but differs in frequency and duty ratio. However, the duty ratio of the idle signal may be set equal to that of the SV signal. For example, the duty ratio may be set to 50%. A command signal is produced in such a way that its 1s and 0s are made to correspond with the presence of the SV signal and the presence of the idle signal, respectively. As described previously, the frequency of the command signal is set to 10 to 20 kHz.

In the example of FIG. 3A, the frequency of the idle signal is assumed to be 5 MHz. This is merely exemplary and not restrictive. It is required only that the frequency of the idle signal differ from that of the SV signal. Thus, by setting the maximum power of the idle signal equal to that of the SV signal, the same laser can be driven with the same output level for both the SV signal and the idle signal. In addition, changeover between the SV signal and the idle signal can be simply made by changing over a switch. Therefore, the circuit arrangement can be made simple and no delay is involved in changing over between the SV signal and the idle signal, which, in the prior art, is caused by the delayed response of the laser as described previously. As a result, no noise due to the delayed response of the laser is produced in an optical fiber and each repeater becomes able to receive the command signal correctly.

Figure 3B:
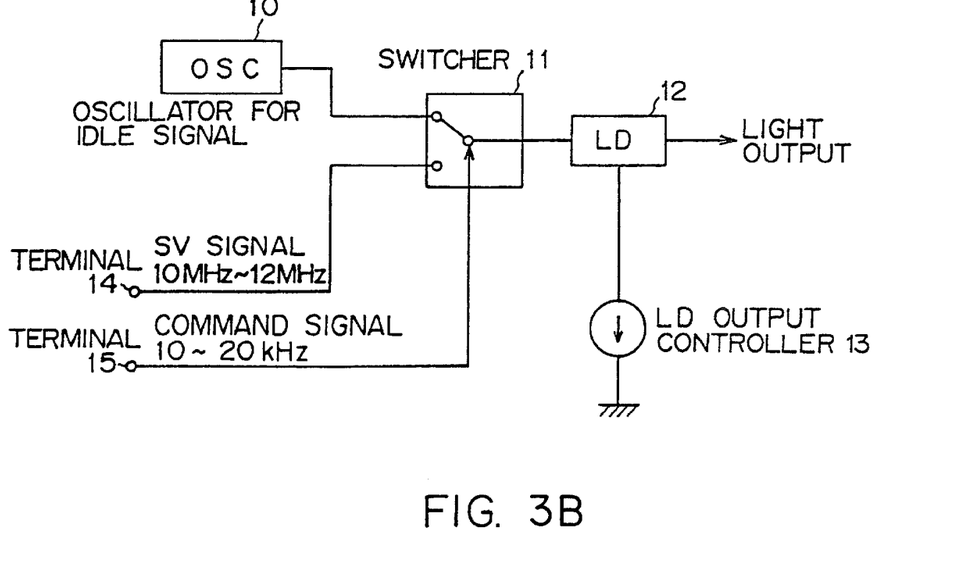

FIG. 3B shows an arrangement of the SV and idle signal generating circuit.

This circuit is installed in a station set to transmit the SV signal. Though not shown, an SV signal oscillator is connected to a terminal 14, which generates, for example, a rectangular wave of 10 to 12 MHz. This circuit is further equipped with an oscillator 10 for generating the idle signal which is, for example, a rectangular wave of 5 MHz. The SV signal from the terminal 14 and the idle signal from the oscillator, which are both electrical signals, are applied to a switcher 11. The switcher selectively applies one of the SV signal and the idle signal to a laser diode 12, which is responsive to an electrical input signal to produce a corresponding light signal, i.e., a light SV or idle signal.

The output of the laser diode 12 is controlled by regulating electrical power applied to the laser diode by an LD output controller 13. That is, the LD output controller 13 controls the laser diode 12 so that its output will be kept constant all the time.

The switcher 11 is controlled by an electrical signal applied through a terminal 15 from a command signal generator (not shown) which generates a command signal of a frequency of, for example, 10 to 20 kHz. For example, when the electrical signal from the terminal 15 is high in level, the switcher 11 selects and applies the signal from the terminal 14 to the laser diode 12. On the other hand, when the signal from the terminal 15 is low in level, the switcher selects and applies the signal from the idle signal oscillator 10 to the laser diode 12. Thus, by switching between the SV signal and the idle signal for transmission over an optical fiber (not shown), 1s and 0s of the command signal are recognized at a specific repeater.

In order for each repeater to recognize commands used for supervision and control from a station, it is required to standardize the frequencies of the SV signal and the command signal on the entire network. However, the idle signal may be set at any frequency provided that it differs from the frequencies of the SV and command signals because the idle signal is used only for the purpose of stabilizing the transmission characteristics of the optical transmission path.

Figure 4A:
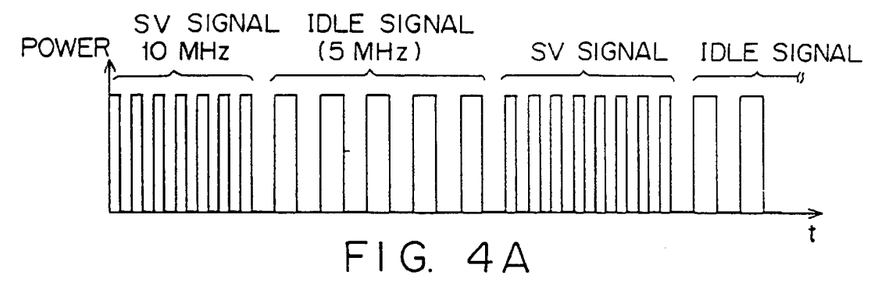
FIGS. 4A, 4B and 4C are diagrams for use in explanation of a method of receiving a command signal at repeaters on a network.
Figure 4B:
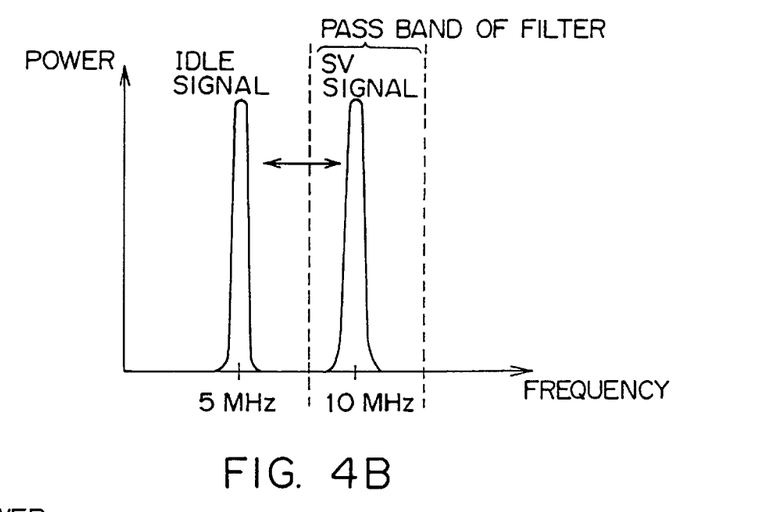
Figure 4C:
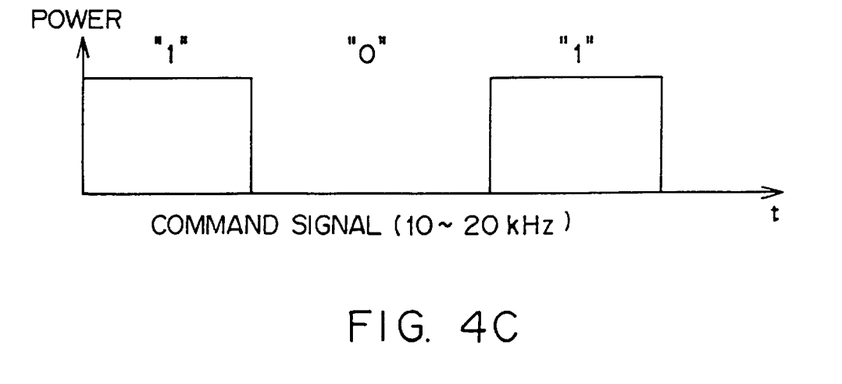

FIGS. 4A, 4B and 4C are diagrams for use in explanation of a method for repeaters on the network to receive the command signal.

As described previously, a signal which is switched between the SV signal and the idle signal as shown in FIG. 4A is applied to each repeater. In this example, it is assumed that the SV signal is 10 MHz in frequency and the idle signal is 5 MHz. When the idle signal is not used and the SV signal is not output, nothing is sent or direct-current light is sent.

As shown in FIG. 4B, each repeater is equipped with a filter adapted to detect only the SV signal of 10 MHz. When the input signal is switched from the SV signal to the idle signal, the input frequency varies with the result that no signal passes through the filter. That is, when receiving the SV signal whose frequency is within the passband of the filter, the repeater recognizes the presence of an incoming signal. On the other hand, when receiving the idle signal whose frequency is out of the passband of the filter, the repeater recognizes that no signal is being sent. By extracting only the SV signal, the repeater can make an incoming signal that passes through the filter and the absence of such an incoming signal correspond with a 1 and a 0 of data, respectively. Thus, such a command signal as shown in FIG. 4C can be recognized.

The command signal contains identification information that identifies each repeater and a command to make a request for acquiring its status. Each repeater examines the identification information to decide whether or not the command is directed to it. If it is, the repeater further acquires the status acquisition command to perform processing based on that command.

Figure 5A:
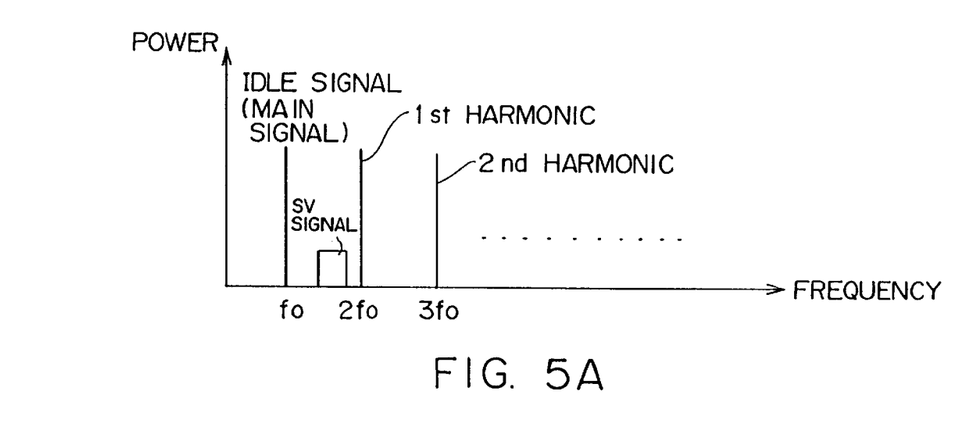
FIGS. 5A and 5B illustrate another embodiment of the present invention.
Figure 5B:
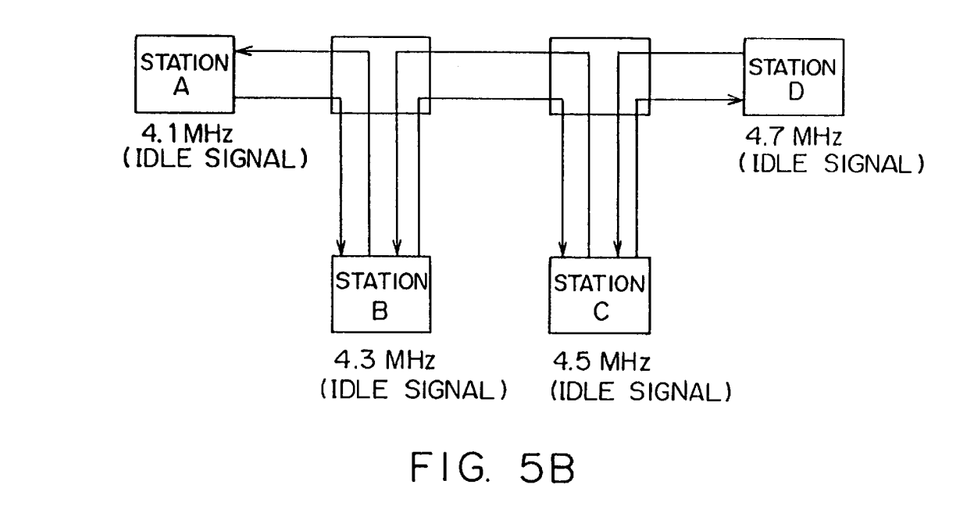

FIGS. 5A and 5B illustrate another embodiment of the present invention.

In the embodiment shown in FIGS. 3A and 3B, the frequencies of the SV signal and the idle signal are assumed to be 10 MHz and 5 MHz, respectively. The idle signal, which is a rectangular wave, will contain higher harmonic components. For example, assuming the idle signal frequency to be fo, higher harmonic components of 2fo, 3fo, . . . will be produced. Under the conditions in which the idle signal frequency is 5 MHz and the SV signal frequency is 10 MHz, that higher harmonic of the idle signal that has twice the frequency of the idle signal will have the same frequency as the SV signal.

As described in conjunction with FIG. 4B, each repeater is arranged to extract only the SV signal by the use of the filter that allows the SV signal frequency to pass through and recognize a command signal accordingly. If a higher harmonic of the idle signal has the same frequency as the SV signal, then the repeater may recognize that higher harmonic as the SV signal by mistake. That is, data errors may occur.

In this embodiment, therefore, the frequency of the SV signal is set so that it does not coincide with the frequency of any one of higher harmonics of the idle signal as shown in FIG. 5A. Alternatively, the frequency of the idle signal is set so that none of its higher harmonics coincide in frequency with the SV signal. Such setting prevents each repeater from recognizing one of higher harmonics of the idle signal as the SV signal. That is, the occurrence of data errors can be prevented.

The SV signal needs to be recognized identically in each repeater. In building a system, therefore, it is recommended that the frequency of the SV signal be determined first and each repeater be equipped with a filter that can extract the frequency of the SV signal. For the idle signal, it is recommended that its frequency be set to such a value that none of its higher harmonics will coincide with the frequency of the SV signal in each terminal after optical fibers and repeaters have been installed. This setting can be achieved by simply replacing the idle signal generating oscillator of FIG. 3B with an oscillator which generates a suitable frequency.

For example, when the SV signal frequency is in the range between 10 and 12 MHz, the idle signal can be set to any frequency in the range of 6 to 10 MHz, 4 to 5 MHz, or 3 to 3.33 MHz.

Since the frequency of the idle signal is lower than that of the SV signal, the maximum modulating frequency for the laser diode is determined by the maximum frequency of the SV signal. Thus, a mere circuit which is designed to modulate the laser diode with the SV signal will suffice to modulate the laser diode; for, by dropping the modulating frequency the same circuit can be used to produce the idle signal. Thus, the hardware configuration for laser diode modulation can be suppressed to a required minimum.

As described in the Description of the Related Art, it is desirable that the SV signal be transmitted in as few wavelengths as possible through as many repeaters as possible. When the SV signal frequency (wavelength) is changed at each repeater, it becomes necessary to provide as many channels as there are repeaters, which wastes the valuable wavelength band for optical transmission and makes the system costly because each repeater cannot be constructed identically. However, if the network is not very large and moreover the number of repeaters is not very large, it will be possible to transmit SV signals which differ in frequency for each repeater. In this case, each repeater can identify an SV signal addressed to it by merely detecting the SV signal frequency, thus permitting its circuit arrangement to be simplified. In FIG. 5A, the SV signal is indicated as if it had a frequency band. This is done bearing in mind that each frequency within the frequency band is assigned to a respective one of the repeaters and SV signals whose frequencies vary among the repeaters are transmitted. The same is true of the following description and drawings.

On the other hand, the idle signal is not detected at each repeater and hence its frequency may be any frequency provided that it does not coincide with the SV signal frequency. An example of a system configuration featuring such a point is illustrated in FIG. 5B.

In the system of FIG. 5B, each station is set to transmit an idle signal of a different frequency. By detecting the frequency of an idle signal received, each terminal can examine which station the SV signal is being sent from. If necessary, each repeater may be equipped with means for detecting the idle signal frequency to thereby recognize which station the SV signal has been received from.

In this case, each station is arranged to loop back an idle signal of a specific frequency sent from a certain station as it is without conversion of its frequency. In this case, by detecting the frequency of the received SV signal at idle time, each station can recognize which station it is connected with. This allows modifications to the system configuration (the addition or removal of stations, etc.) and failures to be detected automatically.

For example, if the frequency of an idle signal detected at the station C is 4.3 MHz, the station can recognize that the SV signal has been sent from station B. If the idle signal frequency is 4.1 MHz, then the station C will recognize that the station B performs a process of merely looping back the SV signal and the SV signal is being sent from the station A. Further, if the idle signal frequency is 4.7 MHz, the station C will recognize that the station D is sending the SV signal and the stations A and B are merely looping back the SV signal.

In particular, when the station C detects 4.5 MHz, the station C will know that a light signal transmitted by itself has traveled through the stations D, A, B, and C. This can be used to check whether the SV signal path is normal throughout the system.

Figure 6:
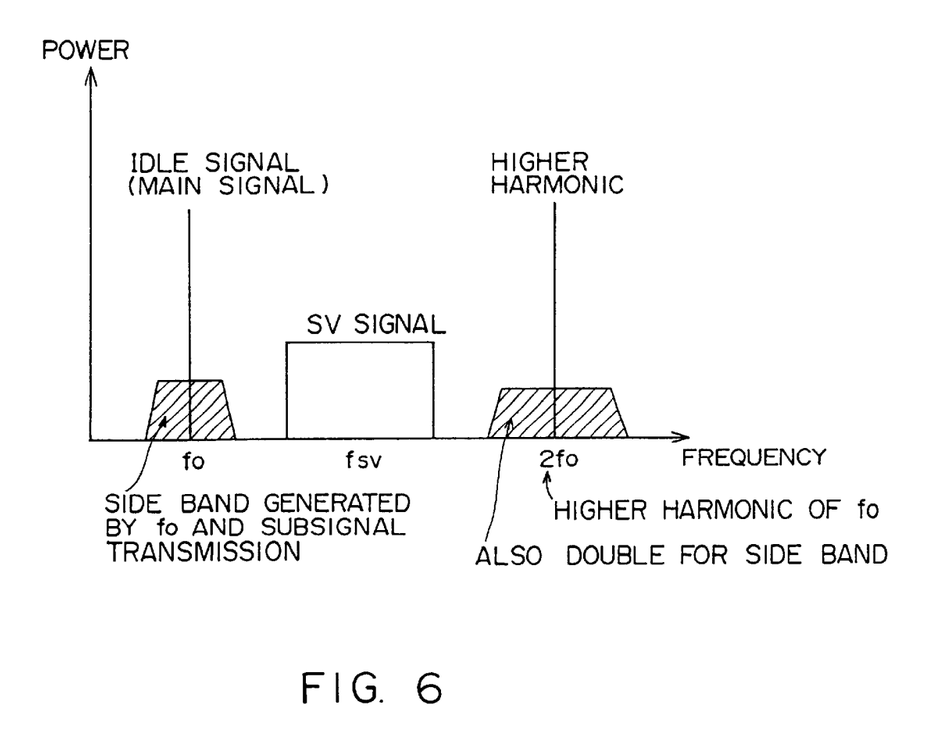
FIG. 6 illustrates an application of the system using the idle signal.

FIG. 6 is a diagram for use in explanation of an application of the system using an idle signal.

In the examples described so far, the idle signal is used without bearing any information. This does not take full advantage of the available band and involves waste from the standpoint of maximum information transmission requirement of the system.

As shown in FIG. 6, an idle signal of a frequency fo is subjected to frequency modulation (FM) with some data, thereby allowing a subsignal to be transmitted. This is used for information exchange between each station. In FIG. 6, there is illustrated the frequency spectrum of a light signal when the idle signal is subjected to frequency modulation, this spectrum indicating the occurrence of sidebands. Sidebands are produced by modulating the idle signal and likewise sidebands are produced in its higher harmonics accompanied by the modulation of the idle signal, when the idle signal is modulated. In FIG. 6, the frequency of a higher harmonic shown is twice the frequency of the idle signal and the bandwidth of its sidebands is also twice that of the sidebands of the idle signal. Though not shown, higher harmonics are also produced whose frequencies are triple, quadruple, etc., the idle signal frequency. The bandwidths of sidebands associated with these higher harmonics also increase by a factor of three, four, etc.

In this application as well, the frequency of the idle signal and its associated sideband are set not to overlap with the frequency band of the SV signal in order to prevent each repeater from recognizing the idle signal or its associated subsignal as the SV signal by mistake.

An example of using the subsignal transmission in this application will be described based on the network configuration shown in FIG. 5B. In this case, there is no necessity that the frequencies of idle signals sent from the terminals should be different from one another.

An application of the subsignal transmission is for the station A, which is set to transmit the SV signal, to send to the station B a message stating that the station A is about to send the SV signal and other stations should prepare for it through the use of the sidebands of the idle signal. Upon receipt of that message, the station B makes ready to receive the SV signal and, on readiness, sends the received message to the station C. Like the station B, the station C makes ready and then sends the message to the station D. Likewise, the station D makes ready and then sends the message to the station A. When the message returns to the station A, it decides that all the stations are ready and then transmits the SV signal.

Thus, by frequency-modulating the idle signal to send information, communications can be made between each station. which is adaptable to various applications.

Figure 7A:
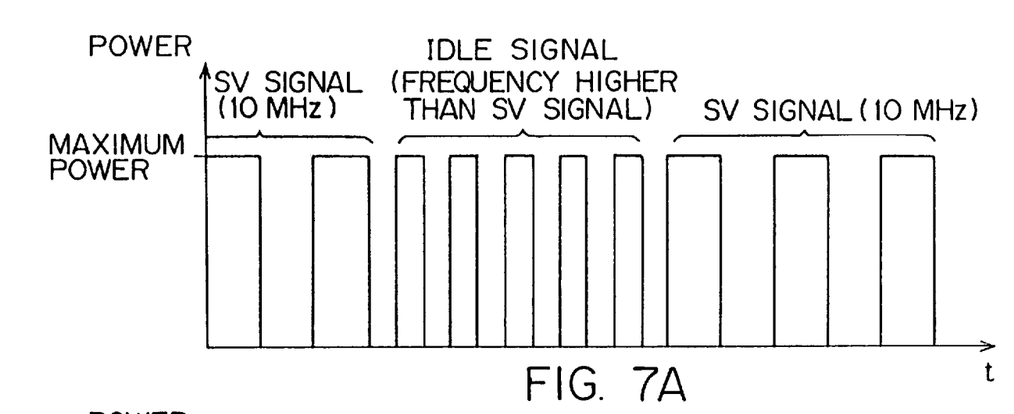
FIGS. 7A and 7B illustrate still another embodiment of the present invention.
Figure 7B:
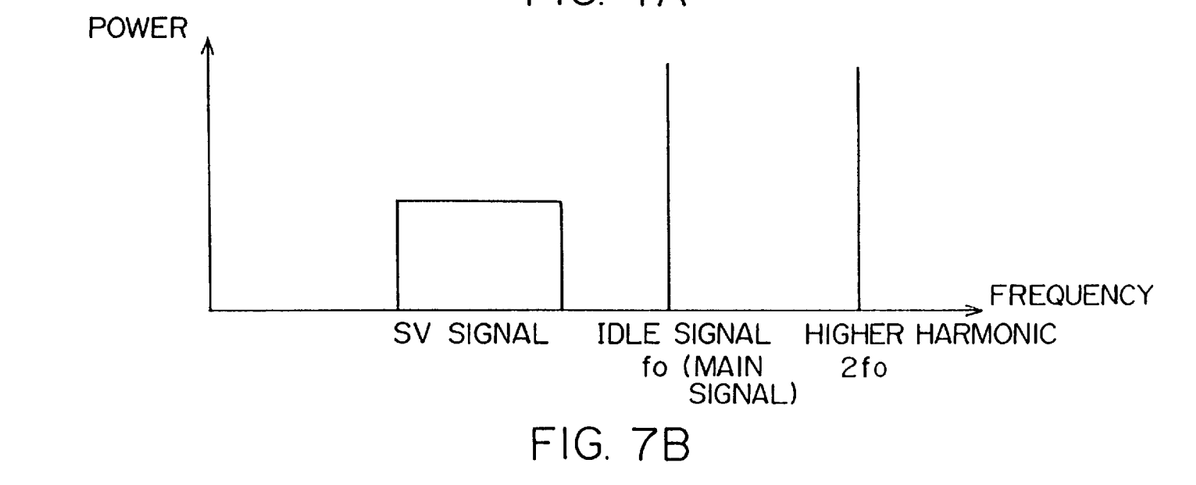

FIGS. 7A and 7B show still another embodiment of the present invention.

In the embodiments described previously, the frequency of the idle signal is set lower than that of the SV signal. In this embodiment, the frequency of the idle signal is set higher than that of the SV signal.

FIG. 7A shows the SV signal and the idle signal in the present embodiment.

As in the embodiments described previously, the maximum power of the idle signal is set equal to that of the SV signal. This makes the SV/idle signal generating circuit simple in arrangement because the circuit only needs means for merely changing the driving frequency for the light source (laser). The frequency of the SV signal is still assumed to be about 10 MHz. The idle signal may be set to any frequency provided that it differs from that of the SV signal. In particular, the previously described embodiments in which the idle signal is lower in frequency than the SV signal has a problem that each repeater receives signals in error when the frequency of a higher harmonic of the idle signal coincides with the frequency of the SV signal. If, on the other hand, the frequency of the idle signal is set higher than the frequency of the SV signal, such a problem will not arise. This is because scarcely any one of frequency components of the idle signal of a rectangular wave appears on the low-frequency side. For this reason, greater freedom is provided in idle signal frequency setting.

FIG. 7B shows a frequency relationship between the SV signal and the idle signal.

When the frequency of the idle signal is thus set higher than that of the SV signal, none of the frequency components associated with the idle signal are recognized as the SV signal by mistake. The idle signal may therefore be set to any frequency provided that the main signal of the idle signal and the SV signal are spaced in frequency to such an extent that no direct interference occurs therebetween.

When the idle signal is frequency modulated for subsignal transmission as described in conjunction with FIG. 4, the frequency of the idle signal can be set with great freedom. It is therefore easy to prevent the sidebands associated with the idle signal from overlapping with the SV signal, i.e., it is easy to reserve the transmission band.

Note that, instead of frequency modulating the idle signal as described above, phase modulation can be employed.

According to the present invention, the method of keeping the power of a light signal that propagates through an optical fiber when a supervisory signal is being transmitted equal to the power of the light signal when no supervisory signal is transmitted can be implemented with a circuit that is simple in arrangement and inexpensive.

In addition, the idle signal which is transmitted while no supervisory signal is transmitted can be employed to detect modifications to the system configuration and system failures automatically or make station-to-station communications.

What is claimed is:

1. A supervisory signal transmitter for use with a WDM communications system comprising:
    a light source unit driven by an electrical signal, converting the electrical signal to a corresponding light signal;
    a supervisory signal generating unit generating an electrical signal having a predetermined frequency to be used for driving said light source unit to produce a supervisory signal;
    an idle signal generating unit generating an electrical signal having a frequency different from the predetermined frequency of the supervisory signal to be used for driving said light source unit to produce an idle signal; and
    a switching unit switching between the electrical signal generated by said supervisory signal generating unit and the electrical signal generated by said idle signal generating unit to selectively apply to said light source unit, whereby the supervisory signal is output from said light source unit while no idle signal is output from said light source unit and vice versa, and whereby the supervisory signal and the idle signal are alternately transmitted so that the alternately transmitted signals are constantly transmitted, and a receiver of the alternately transmitted signals extracts information about supervision of the WDM communications system by detecting a change of frequency between the supervisory signal and the idle signal.

2. The transmitter according to claim 1, wherein the average power of the supervisory signal and that of the idle signal are substantially equal to each other.

3. The transmitter according to claim 1, wherein the maximum power of the supervisory signal and that of the idle signal are substantially equal to each other.

4. The transmitter according to claim 1, wherein the frequency of the idle signal is lower than that of the supervisory signal.

5. The transmitter according to claim 4, wherein the frequency band of the supervisory signal and the frequency band of higher harmonics of the idle signal do not overlap with each other.

6. The transmitter according to claim 1, wherein the frequency of the idle signal is higher than that of the supervisory signal.

7. The transmitter according to claim 1, wherein the transmitter is installed in each station of the WDM communications system, and each station is adapted to transmit the idle signal of a different frequency.

8. The transmitter according to claim 1, wherein the idle signal is modulated with information to thereby transmit the information.

9. A supervisory signal transmitting method for use with a WDM communications system comprising:
    generating a first electrical signal having a predetermined frequency for producing a supervisory signal;
    generating a second electrical signal having a frequency different from the predetermined frequency of the first electrical signal for producing an idle signal;
    switching between the first electrical signal and the second electrical signal to output the first and second electrical signals alternately; and
    converting each of the first and second electrical signals ouput in said switching into a light signal, and whereby the supervisory signal and the idle signal are alternately transmitted so that the alternately transmitted signals are constantly transmitted, and a receiver of the alternately transmitted signals extracts information about supervision of the WDM communications system by detecting a change of frequency between the supervisory signal and the idle signal.

10. The method according to claim 9, wherein the average power of the supervisory signal and that of the idle signal is substantially equal to each other.

11. The method according to claim 9, wherein the maximum power of the supervisory signal and that of the idle signal is substantially equal to each other.

12. The method according to claim 9, wherein the frequency of the idle signal is lower than that of the supervisory signal.

13. The method according to claim 12, wherein the frequency band of the supervisory signal and the frequency band of higher harmonics of the idle signal do not overlap with each other.

14. The method according to claim 9, wherein the frequency of the idle signal is higher than that of the supervisory signal.

15. The method according to claim 9, wherein a transmitter is installed in each of stations that make up the WDM communications system, and each station is adapted to transmit the idle signal of a different frequency.

16. The method according to claim 9, wherein the idle signal is modulated with information to thereby transmit the information.

17. A method of transmitting a supervisory signal and an idle signal in an optical communications network, comprising:
    generating the supervisory signal with a predetermined frequency and the idle signal with a frequency different from the predetermined frequency of the supervisory signal;
    alternately switching between the supervisory signal and the idle signal so that either the supervisory signal or the idle signal is being transmitted at any time;
    receiving the alternately transmitted signals and extracting supervisory information by detecting a change in frequency between the supervisory signal and the idle signal.

* * * * *

UNITED STATES PATENT AND TRADEMARK OFFICE
CERTIFICATE OF CORRECTION

PATENT NO.    : 6,310,708 B1
DATED         : October 30, 2001
INVENTOR(S)   : Kenji Ota et al.

It is certified that error appears in the above-identified patent and that said Letters Patent is hereby corrected as shown below:

Column 10,
Line 31, change "signal is" to -- signal are --.
Line 35, change "signal is" to -- signal are --.
Line 45, delete "of stations that make up" and insert -- station of --.

Signed and Sealed this

Twenty-fifth Day of June, 2002

*Attest:*

JAMES E. ROGAN
*Director of the United States Patent and Trademark Office*

*Attesting Officer*